(12) United States Patent
McClung

(10) Patent No.: US 8,023,630 B2
(45) Date of Patent: Sep. 20, 2011

(54) TECHNIQUES FOR VOICE INSTANT MESSAGING ON A TELEPHONE SET

(75) Inventor: Michael McClung, Ruckersville, VA (US)

(73) Assignee: Cisco Technology, Inc., San Jose, CA (US)

( * ) Notice: Subject to any disclaimer, the term of this patent is extended or adjusted under 35 U.S.C. 154(b) by 1422 days.

(21) Appl. No.: 11/512,532

(22) Filed: Aug. 29, 2006

(65) Prior Publication Data

US 2008/0069318 A1    Mar. 20, 2008

(51) Int. Cl.
*H04M 3/42*    (2006.01)

(52) U.S. Cl. .................. 379/201.01; 379/260; 709/238; 715/753; 715/758

(58) Field of Classification Search .................. 370/352, 370/260; 709/238, 204, 227; 379/201.01; 715/753, 758
See application file for complete search history.

(56) References Cited

U.S. PATENT DOCUMENTS

| 7,013,155 | B1 | 3/2006 | Ruf et al. | |
|---|---|---|---|---|
| 7,085,258 | B2 | 8/2006 | Creamer et al. | |
| 2002/0078150 | A1* | 6/2002 | Thompson et al. | 709/204 |
| 2003/0016657 | A1* | 1/2003 | Creamer et al. | 370/352 |
| 2008/0003964 | A1* | 1/2008 | Alperin et al. | 455/185.1 |

* cited by examiner

*Primary Examiner* — Fan Tsang
*Assistant Examiner* — Simon King
(74) *Attorney, Agent, or Firm* — Patent Capital Group

(57) ABSTRACT

Techniques for voice instant messaging (VIM) on a programmable telephone set include receiving configuration data that includes VIM ID data that indicates a particular group of telephone sets. A start signal is received that indicates a start of a new message directed to the particular telephone set over a particular communication channel associated with the VIM ID. In response, VIM audio data received over the communication channel is recorded. It is determined whether the particular telephone set is currently in use. If not, then the VIM audio data is played over a speaker on the particular telephone set. These techniques allow instant, persistent audio messages to multiple recipients without a computer.

31 Claims, 5 Drawing Sheets

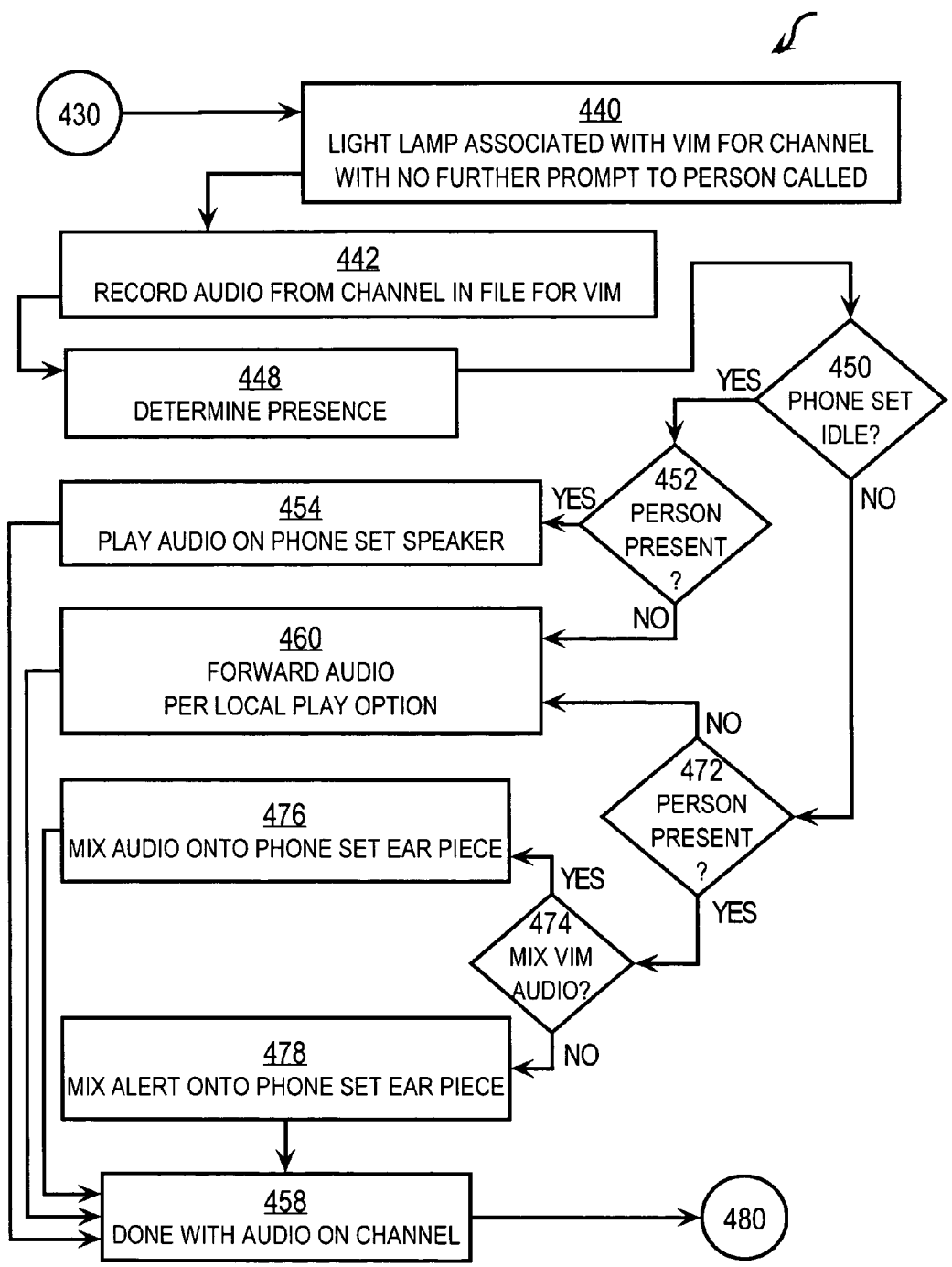

TECHNIQUES FOR VOICE INSTANT MESSAGING ON A TELEPHONE SET

BACKGROUND OF THE INVENTION

1. Field of the Invention

The present invention relates to communicating voice data over a packet-switched or circuit-switched network with a telephone set for use by a human; and, in particular relates to providing a voice instant messaging (VIM) service on a programmable telephone set.

2. Description of the Related Art

Networks of communications devices, general-purpose computer systems and specific purpose devices connected by external communication links are well known and widely used in commerce. The networks often include one or more network devices that facilitate the passage of information between end stations, such as telephones and general purpose computing devices, which originate or receive the information. A network node is a network device or end station connected by the communication links. Information is exchanged between network nodes in discrete data packets according to one or more of many well known, new or still developing protocols. In this context, a protocol consists of a set of rules defining how the nodes interact with each other based on information sent over the communication links. The protocols are effective at different layers of operation within each network node, from generating and receiving physical signals of various types, to selecting a link for transferring those signals, to the format of information indicated by those signals, to identifying which software application executing on a computer system sends or receives the information. Signaling between nodes is typically effected by exchanging special data packets called control plane data packets. Each data packet typically comprises 1] header information associated with a particular protocol, and 2] payload information that follows the header information and contains information that may be processed independently of that particular protocol. Often, the data in the payload for the particular protocol includes a header and payload for a different protocol associated with a different, usually higher layer protocol. The payload protocol is said to be encapsulated in the header protocol.

Commercial services that provide voice data communicated over a packet-switched network predominately use the Internet Protocol (IP) as the internetworking layer protocol to communicate with devices on different networks. A voice data session over IP between end stations is set up predominately using IP datagrams that include in the IP payload the Session Initiation Protocol (SIP) header and payload. The SIP header provides information about the party that originated the voice data, e.g., a caller network identifier ("caller ID") and the called party, e.g., a target network identifier ("target ID").

Many telephone sets, including wireless mobile telephone sets and computers so configured, include one or more speakers for presenting audio data, microphones for collecting audio data and displays for presenting visual data. Some include visual recorders, such as digital cameras and video recorders. On programmable telephone sets, functions of at least some of these elements can be controlled by instructions, called software, that can be changed without a change in equipment. The software is executed by processor either on the telephone set itself or on a remote host in communication with the telephone set either directly or indirectly through a network. For various telephone sets, the software provides services such as call forwarding and voice mail and text messaging.

Many services are known using communication networks. A popular service is instant messaging (IM), whereby a server connected to a computer via a network detects when the computer is active and allows other users on the network to send text to the computer when the computer is active. When text is delivered to the active computer, the computer displays the text instantly in at least a portion of a visual display screen. The IM service, however, does not include both instant audio play of voice or other audio data generated in real time and persistence. Furthermore, IM requires a computer or similar device and a display with sufficient display area for a substantial amount of text. Although a computer with at least one speaker and one microphone linked to a network can be programmed to operate as a telephone set, in general, computers are more expensive and less available than telephone sets that do not do general purpose computing.

Voicemail is a service whereby one sender uses a telephone set to record an audio message directed to a particular recipient. The sender must dial the recipient, listen to a message that the recipient is not available and wait for a prompt to begin recording. The recorded audio message lies dormant until the recipient decides to retrieve and listen to the message, typically using another telephone set. One shortcoming of voicemail is the requirement to wait for a prompt before the audio content can be recorded. Another shortcoming of voicemail is that id does not provide instant presentation of the audio data. The content can become stale or obsolete before the listener plays the message.

An intercom is a service by which one button on one telephone set activates speakers on several telephone sets. However, an audio message sent in real time over the intercom service is transient and does not persist to be replayed in case the intended recipient is not in the vicinity of the telephone set speaker, or did not understand the audio message completely.

Based on the foregoing, there is clear need for techniques that allow instant audio messaging for voice and other real-time audio data, which do not suffer the disadvantages of prior art approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4A and FIG. 4B constitute a flow diagram that illustrates a method for providing a VIM service, according to an embodiment.

DETAILED DESCRIPTION

A method and apparatus are described for voice instant messaging (VIM). In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

As used herein, a telephone set is a device that includes at least one microphone, at least one speaker and is capable of being connected to a network for exchanging over the network real time audio data with at least one other telephone set. Telephone sets include computers configured with proper hardware and software, and devices without general purpose computing power, such as office desk telephone sets, speaker phones, portable phones, cell phones, and plain old telephone system (POTS) analog phone sets. Programmable telephone sets include telephone sets for which at least one visual presentation element and at least one speaker can be controlled by software.

Figure 1:
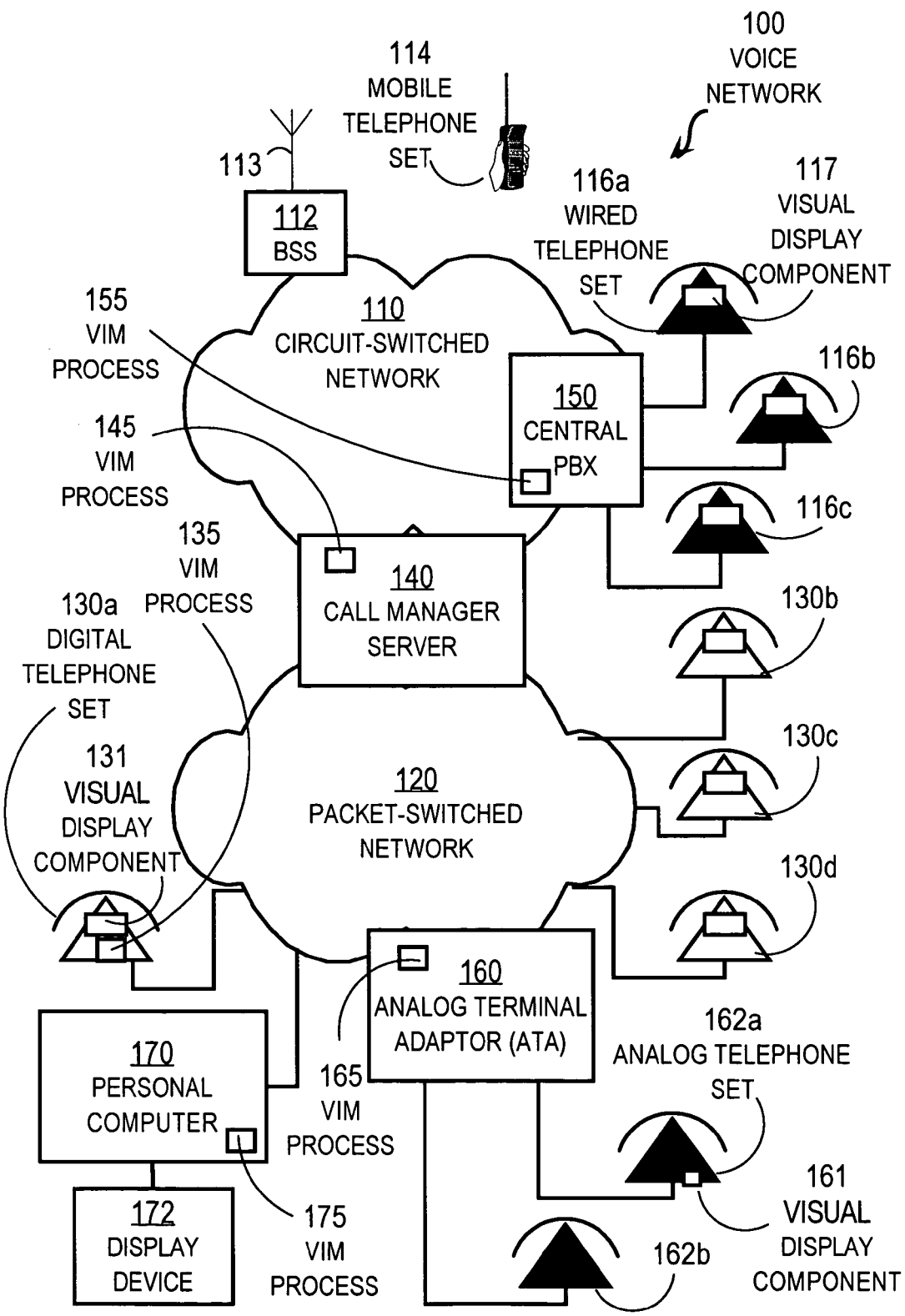
FIG. 1 is a block diagram that illustrates a voice network that communicates voice and other data, according to an embodiment.

Embodiments of the invention are described in the context of voice calls transported from one smart telephone set to another at over an Internet Protocol IP network in a non-public enterprise network. However, the invention is not limited to this context, and other embodiments may use real time audio data transported over other types of network infrastructure, including the public Internet and computers configured as telephone sets. Furthermore, VIM may be implemented by making calls using other networks, such as Public-Switched Telephone Network (PSTN), Integrated Services Digital Network (ISDN), optical Fiber Distributed Data Interface (FDDI), and wireless mobile phone network 1.0 Voice Network Overview FIG. 1 is a block diagram that illustrates a voice network 100 that communicates voice and other data, using an IP network at least in part. Voice network 100 includes IP network 120, call manager server 140, and circuit-switched network 110

The circuit switched network 110 includes signal transfer point (STP) nodes (not shown) that use Signaling Connection Control Part (SCCP) signaling to communicates signals to set up and break down calls over the circuit switched network 110, and supports both wired and mobile telephone sets such as cell phones, personal digital assistants (PDAs) and both analog and digital signals. The network 110 includes a base station system (BSS) 112 and antenna 113 to communicate with mobile telephone set 114, such as a cell phone. The network 110 is also connected to one or more wired telephone sets, such as wired telephone sets 116a, 116b, 116c (collectively referenced herein as wired telephone sets 116) that are connected to network 110 through a central private branch exchange (PBX) 150. A PBX (e.g., PBX 150) usually belongs to an enterprise and shares several external telephone lines with multiple internal telephone sets (e.g., telephone sets 116), and controls the switching of calls between the telephone sets (e.g., sets 116) and the external circuit-switched network (e.g., network 110).

Circuit-switched network 110 is shown with one BSS 112, antenna 113, mobile voice device 114, one central PBX 150 and three wired telephone sets 116 for purposes of illustration, but in other embodiments, a large number of BSSs 112, mobile devices 114, central PBXs 150 and wired devices 116 are included. The public switched telephone network (PSTN) is a well known and widely used circuit-switched network.

At least some mobile devices 114 and wired devices 116 include programmable visual display components, such a liquid crystal displays (LCDs) and plasma screens and lighted buttons. For purposes of illustration, wired telephones sets 116 are depicted with visual display component (e.g., display component 117 on telephone set 116).

IP network 120 is used to communicate digital voice and multimedia data between digital telephone sets 130a, 130b, 130c, 130d, collectively referenced hereinafter as digital telephone sets 130. In other embodiments, more or fewer digital telephone sets 130 are connected to network 120. Each digital telephone set 130 includes a programmable visual display component 131. These digital telephone sets 130 communicate voice data using a Session Initiation Protocol (SIP) over IP through the IP network 120. Each digital telephone set 130 uses SIP to set up calls with other devices connected to IP network 120. Each digital telephone set detects voice at a microphone and coverts it to digital data that is sent via IP datagrams; and receives IP datagrams with voice data and converts it to sound at a speaker. Data, including voice data, is also communicated with various end nodes, such as personal computer 170 with visual display device 172.

Digital voice data transferred over IP network 120 can be exchanged with legacy analog telephone sets 162a, 162b (collectively referenced hereinafter as analog telephone sets 162). The digital voice data is communicated with an analog terminal adaptor (ATA) 160, which converts to and from analog voice data that is communicated with the analog telephone devices 162. Most analog telephone devices 162 have no text display component, but may have a bank of one or more lighted buttons. For example analog telephone set 162a includes a visual display component 161, such as a lighted button.

The call manager (CM) server 140 performs several services to support voice data over IP network 120. Such functions include resolving network identities and addresses, such as IP addresses, telephone numbers, email identities and instant message identities for voice services, and transferring calls between IP network 120 and circuit-switched network 110, and setting up conference calls among three or more telephone sets.

The client-server model of computer process interaction is widely known and used in commerce. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple servers on multiple hosts (sometimes called tiers) for reasons that include reliability, scalability, and redundancy, but not limited to those reasons.

Thus the call manger server 140 interacts with call clients on digital telephone sets 130 and analog terminal adaptor 160 to set up calls between telephone sets on network 120 and other telephone sets on network 110 and network 120.

According to various embodiments of the invention, one or more processes on telephone sets 116, 130, call manager server 140, central PBX 150, analog terminal adaptor 160, or computer 170, alone or in combination, provide voice instant messaging to programmable telephone sets with at least one programmable speaker and one programmable visual presentation component. In various embodiments, a telephone set hosts a VIM process (e.g., VIM process 135 on telephone set 130a), a call manager server includes a VIM process (e.g., VIM process 145 on server 140), a central PBX hosts a VIM process (e.g., VIM process 155 on PBX 150), an analog terminal adaptor hosts a VIM process (e.g., VIM process 165 on ATA 160), or a computer hosts a VIM process (e.g., VIM process 175 on computer 170), or some combination of hosts or servers include a VIM process. The steps of an example VIM process are described in more detail below with reference to FIG. 4A and FIG. 4B.

2.0 An Example Telephone Set

Figure 2:
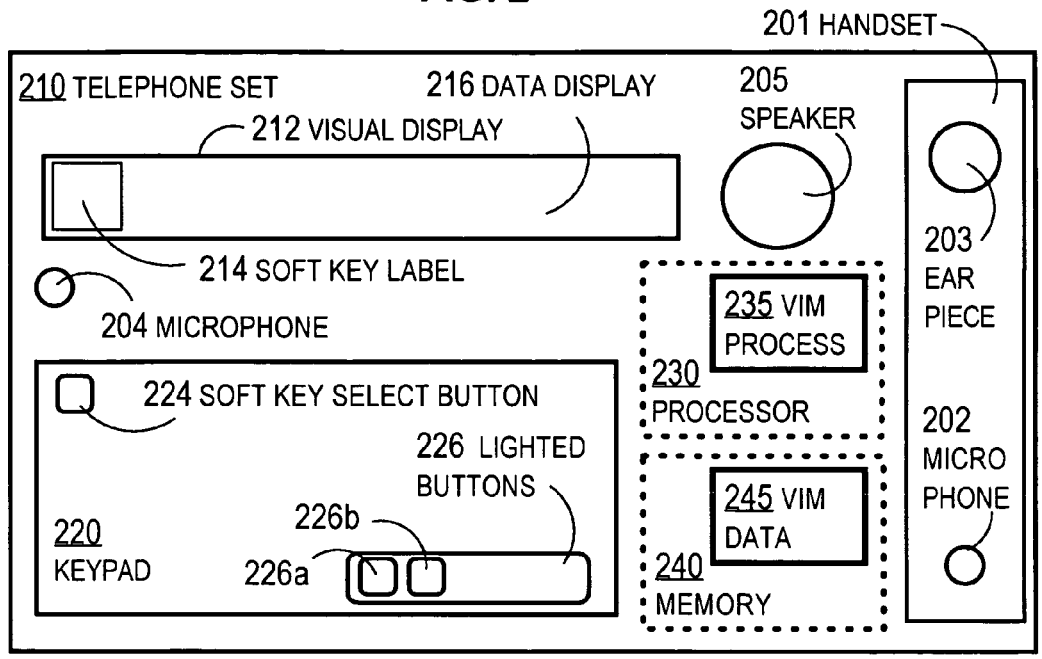
FIG. 2 is a block diagram that illustrates a telephone set, according to an embodiment.

FIG. 2 is a block diagram that illustrates a telephone set 210 according to an embodiment. Telephone set 210 includes a handset 201, room microphone 204, room speaker 205, visual display 512, and keypad 220. An analog or digital network connection is included but is not shown. Although components of telephone set 210 are shown in a particular arrangement for purposes of illustration, in other embodiments, the components or portions thereof occupy other positions on or near the telephone set 210, or are omitted.

The handset 201 includes a mouth piece microphone 202 and an ear piece speaker 203. In some embodiments, handset 201 is replaced by a headset or other device for holding mouth piece microphone 202 close to a user's mouth or ear piece speaker 203 close to a user's ear without depending on the user's hands, such as a hat or helmet. The room microphone 204 is configured to gather sounds from any source within several feet of telephone set 210, while the ear piece microphone is configured to collect sounds uttered by a single individual whose mouth is near the mouth piece microphone. The room speaker 205 is configured to be heard by any person within several feet of telephone set 210, while the ear piece speaker is configured to be heard by a single individual whose ear is near the ear piece speaker. In some embodiments only one of speaker 203 and speaker 205 is present. In some embodiments only one of microphone 202 and microphone 204 is present.

The keypad 220 include multiple keys used in the operation of the telephone set by a human user, such as a numeric keys pad, an alphabetic keypad, or a standard telephone touch tone pad with each key representing a decimal digit or special symbol (*, #) and zero or more letters. In the illustrated embodiment, keypad 220 includes soft key select button 224, and a bank of lighted buttons 226, including lighted button 226a and lighted button 226b. In other embodiments, other control elements operable by a human viewer are substituted, such as a wheel, touch pad, optical sensor, or switch.

The visual display 512 includes a soft key label area 214 and a data display area 216. Soft key label area 214 displays data that indicates a function to be performed if the soft key select button 224 is depressed. Data display area 214 displays data that indicates a state or function of the telephone, such as local time, local telephone number, active extension, and caller identification data. In some embodiments visual display 212 is absent.

In the illustrated embodiment, the telephone set 210 is a smart phone with an internal processor 230 and memory 240. A VIM process 235 executes on processor 230 based on data in VIM data 245 on memory 240. VIM process 235 is described in more detail below with reference to FIG. 5A and FIG. 5B. VIM data 245 is described in more detail next with reference to FIG. 3.

According to various embodiments of the invention, one or more visual presentation devices, such as visual display 212 and lighted buttons 226, indicate the arrival and persistent storage of VIM audio data as it is sent by a user of a different telephone set, and one or more of speaker 203 and speaker 205 presents the VIM audio data, depending on a current state of the receiving telephone set (e.g., whether telephone set 210 is currently in use on another call) or user presence data or both.

3.0 An Example VIM Data Structure

Figure 3:
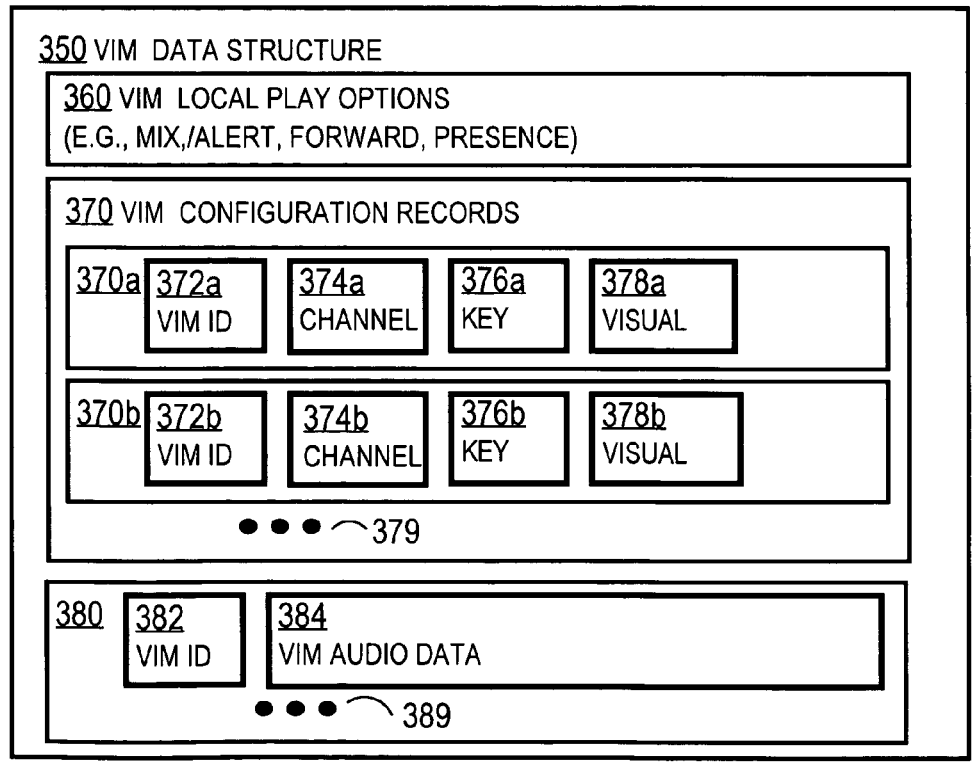
FIG. 3 is a block diagram that illustrates a voice instant messaging (VIM) data structure, according to an embodiment.

FIG. 3 is a block diagram that illustrates a voice instant messaging (VIM) data structure 350, according to an embodiment. Data structure 350 includes VIM local play options field 360, VIM configuration records 370 and VIM audio data records 380. In some embodiments, VIM data 245 on telephone set 210 includes all or part of VIM data structure 350.

The VIM local play options field 360 holds VIM configuration data that indicates how to present VIM audio data on the local device, e.g., telephone set 210. It is anticipated that different users have different preferences for how and when the VIM audio data sent to them is presented, as will be described in more detail below. Here it is sufficient to note that data indicating such preferences are stored in field 360 for the user or users of a particular telephone set. This information is the same for all VIM IDs in some embodiments, including the illustrated embodiment, but depends on the VIM ID in some embodiments.

The VIM configuration records 370 includes one or more VIM configuration records, such as VIM configuration record 370a, VIM configuration record 370b, and others indicated by ellipsis 379. Each VIM configuration record 370 is associated with a particular group of telephone sets that use a VIM service. Each record 370 includes a VIM ID field (e.g., VIM ID field 372a in record 370a and VIM ID field 372b in record 370b, and others in other records indicated by ellipsis 379, collectively referenced herein as VIM ID field 372). Each VIM configuration record 370 also includes a channel field (e.g., channel field 374a in record 370a and channel field 374b in record 370b, and others in other records indicated by ellipsis 379, collectively referenced herein as channel field 374). Each VIM configuration record 370 also includes a key field (e.g., key field 376a in record 370a and key field 376b in record 370b, and others in other records indicated by ellipsis 379, collectively referenced herein as key field 376). Each VIM configuration record 370 also includes a visual field (e.g., visual field 378a in record 370a and visual field 378b in record 370b, and others in other records indicated by ellipsis 379, collectively referenced herein as visual field 378).

The VIM ID field 372 holds data that uniquely identifies a particular group of telephone sets that communicate using VIM. Any method may be used to identify the group of telephone sets. For example, it is assumed for purposes of illustration, that VIM ID for group A, designated GA, uniquely identifies a group consisting of IP telephone sets 130a, 130b and 130c. Similarly VIM ID for group B, designated GB, uniquely identifies a group consisting of IP telephone sets 130a, 130c, 130d and computer 170. In the illustrated embodiment each telephone stores a VIM configuration record for every VIM group to which the telephone set belongs. In some embodiments, the VIM ID group is stored in association with a list of telephone sets that belong to the group with that VIM ID. Each telephone set may be identified in any manner known in the art. For example, IP telephones are identified by their media access control (MAC) layer addresses (MAC addresses), or by their IP addresses, or by their ten decimal-digit telephone numbers, in various embodiments.

The channel field 372 holds data that indicates a communication channel associated with the VIM ID for communicating with all other telephone sets in the group identified by the VIM ID. For example, for IP telephones, the channel is identified by an IP multicast group. IP multicast groups are well known in the art and are described in Request For Comment (RFC) 3170 available as file rfc3170, along with other RFCs, from the Internet Engineering Task Force (IETF) web site at domain ietf.org in a directory rfc. The entire contents of RFC3170 are herby incorporated by reference as if fully set forth herein. The industry standard for transmitting audio data over IP is the Real-Time Transport (RTP) Protocol described in RFC 1889, the entire contents of which are herby incorporated by reference as if fully set forth herein. In some embodiments using an a circuit-switched network, the channel is a particular phone number, or collection of phone numbers, to place or receive a call with a server, such as central PBX 150, that provides the service of forwarding audio data in a collection of parallel calls to telephone sets in the group associated with the VIM ID. In some embodiments, the channel is a collection of IP addresses for multiple unicast data packets.

The key field 376 holds data that indicates a sequence of one or more keys to invoke a VIM function. Major VIM functions are described in more detail in the next section, and include transmit, repeat and acknowledge, in an illustrated embodiment. For example, in some embodiments, one lighted button indicated in key field 376 is depressed to send VIM audio data, and released to terminate sending VIM audio data (similar to the use of buttons for an intercom function). This lighted button is identified in key field 376. Similarly depressing and releasing the same button causes a VIM repeat function to be performed by which recorded VIM audio data to be played, for example, the next in a series of several VIM audio data recording. To distinguish the button press to "transmit" a message from one to "play" a message, in some embodiments, a minimum depress time, such as one half second, must be exceeded for transmit. For example, if the button is released within one half second, then the function is interpreted as repeat rather than transmit. The minimum time is also included in key field 376 in some of these embodiments. As another example, depressing and releasing that button following a # key depression causes the VIM repeat function, as in an illustrated embodiment. In the illustrated embodiment, depressing and releasing the lighted button following a * key depression causes a VIM acknowledgment function, by which the last played of the recorded VIM audio data is erased. The sequence of the lighted button and the * key and # key is indicated by data in the key field 376. In some embodiments the soft key select button 224 is indicated in key field 276 for one or more VIM functions. In some embodiments the soft key button options are lit when the lighted button associated with a particular VIM ID is depressed.

The visual field 378 holds data that indicates operation of one or more of the visual elements to indicate a VIM state for group indicated by the VIM ID. For example, the lighted button depressed as described in key field 376 is also lighted during transmission. In some embodiments, when not depressed, the same button is lighted when VIM audio data is received on the channel associated with the VIM ID. In some embodiments, other visual indicators are used. For example, in some embodiments, visual field 378 holds data that indicates a symbol, code or text message appears in a display component, e.g., visual display 212 on telephone set 210, to describe a particular VIM state or function on the particular telephone set (e.g., set 210).

The VIM audio data records 380 hold data for zero or more recordings of VIM audio data. In the illustrated embodiment, each record includes a VIM ID field 382 that holds a VIM ID that matches one in the VIM ID fields 372 in the configuration records 370. Associated with the VIM ID field 382 is VIM audio data field 384 where is stored the VIM audio data received for the telephone set on the channel associated with the VIM ID in VIM ID field 382. Ellipsis 389 indicates further VIM audio data associated with the same or different VIM ID values.

Although data structure 350, data records, and data fields are shown in FIG. 3 as contiguous areas of memory in a particular arrangement for purposes of illustration, in other embodiments one or more of data structure 350, records, and fields or portions thereof are arranged in a different order in one or more files or databases on one or more memories on or accessible but remote from memory 240 on telephone set 210.

4.0 Example Method for Voice Instant Messaging Service

Figure 4A:
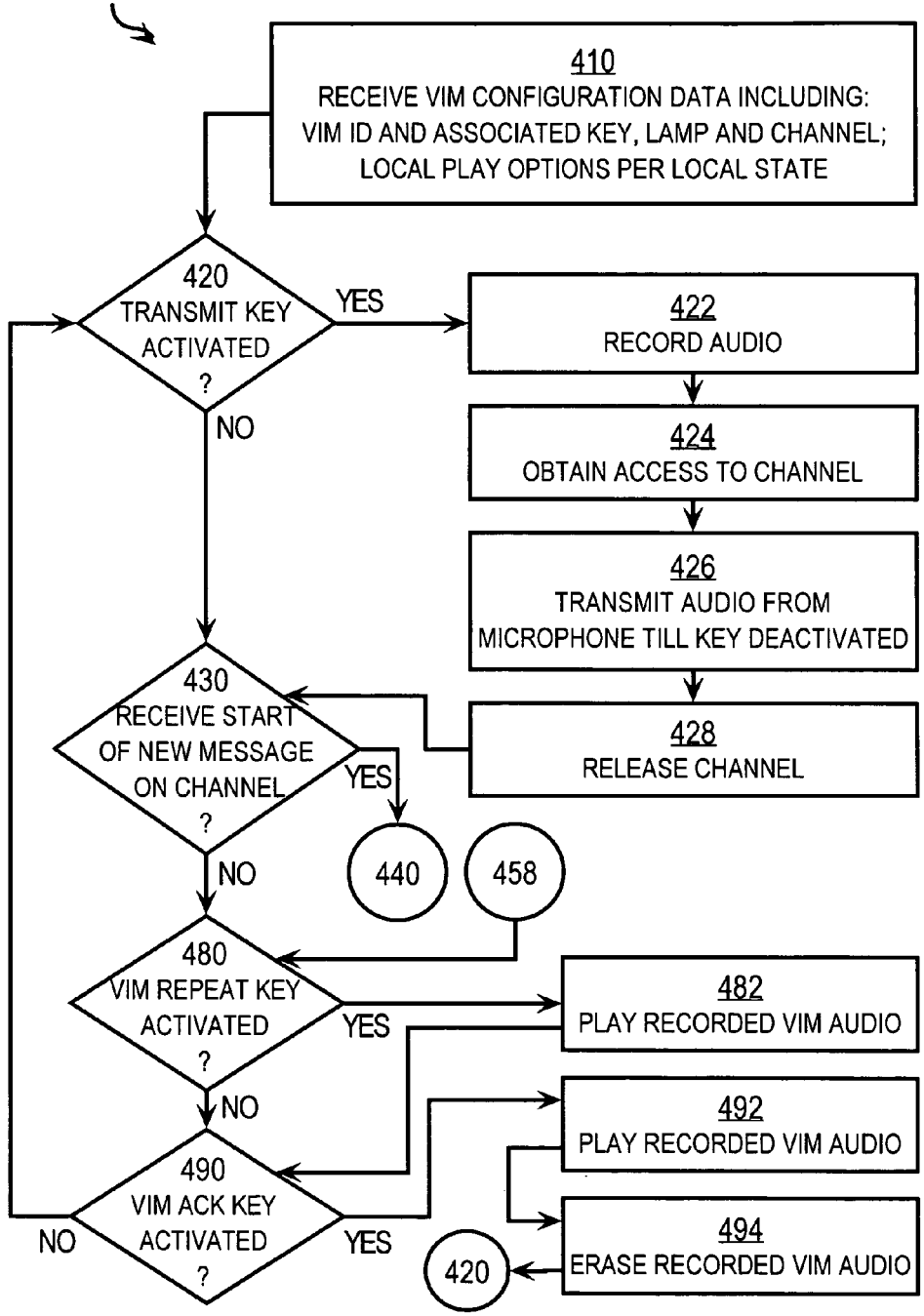

FIG. 4A and FIG. 4B constitute a flow diagram that illustrates a method for VIM, according to an embodiment. Although steps are shown in FIG. 4A and FIG. 4B in a particular order for purposes of illustration, in other embodiments one or more steps are performed in a different order or overlapping in time by one or more processes executing in series or in parallel on one or more processors, or one or more steps are omitted, or the steps are changed in some combination of ways. For example, in some embodiments some steps are performed by a VIM process on an end node, such as process 135 on a digital telephone set 130 and process 175 on a computer 170. In other embodiments, all steps are performed by those processes. In some embodiment, some steps are performed by VIM processes on intermediate nodes, such as VIM process 165 on ATA 160, VIM process 145 on call manager server 140 and VIM process 155 on Central PBX 150. In other embodiments, all steps are performed by those processes.

In step 410, VIM configuration data is received. For example, the configuration data described above for VIM local play options field 360 and VIM configuration records 370 is received and stored in VIM data structure 350 in VIM data 245 on telephone set 210. Any method may be used to receive the data including, but not limited to, predefined data stored within source code or in files stored with the executable code ("default values") or in files or a database accessible to the process (e.g., VIM process 235), manual input either in response to prompts from the process or independently of prompts, or from data included in a message sent to the VIM process by another process, such as VIM process 245 on call manager server 140.

The configuration data in the VIM local play options field 360 is based on user preferences, depending on the state of the phone and the presence of the user. For example, sometimes a user will be using a telephone set for a particular telephone call to one person or group of persons, when the VIM audio data is sent. Some users will want the VIM audio data to be mixed with the audio data received for the particular telephone call already underway. Some users will not want the VIM audio data to be mixed in, but want to be alerted to the arrival and storage of VIM audio data. An alert sound, such as a distinctive series of one or more tones, beeps or chords is allowed to be mixed with the audio data received for the particular telephone call already underway. Some users will not want either the VIM audio data or the alert data, but will rely solely on the visual presentation. Some may want the VIM audio data forwarded, for example to a secretary's telephone set or to the user's voicemail.

By default, if the telephone set is not in use on a different call, the VIM audio data is presented on a room speaker (e.g., speaker 205) if present, or ear piece 203 if a room speaker is not present. In some embodiments, even a user who is not using the telephone set for a different call has a preference for different presentation of the VIM audio data from the default presentation, depending on one or more states of the user or the telephone. For example, if the user is not in the room, the user may want the VIM audio data not to be presented on a room speaker 205, or would rather the audio data be played at a low volume, e.g., because a default presentation might disturb a fellow worker in a nearby office or cubicle. In such embodiments, presence data deduced for other applications, such as IM, is used to determine whether a user is in the room. Example presence data includes computer keyboard activity, time since last use of the telephone set, information in a shared enterprise calendar about the location of the person assigned to the space with the telephone set. Presence data is well known in the art and the subject of much activity and is not described further here. Some presence data is manually input by the user, such as "out to lunch," or "do not disturb."

For purposes of illustration, it is assumed that the configuration data indicated in Table 1 and Table 2 is received at telephone set 130a which is configured as shown by telephone set 210.

TABLE 1

Example local play options indicated by configuration data

| Telephone Set State | Local Presentation Option |
|---|---|
| Idle - presence unknown | room speaker - low volume |
| Idle - not present, do not disturb | forward to voice mail |
| Idle - other presence | room speaker - normal volume |
| Busy - presence unknown | ear piece speaker - alert sound |
| Busy - not present, do not disturb | forward to voice mail |
| Busy - other presence | ear piece speaker - VIM audio data |

TABLE 2

Example VIM group specific configuration data

| Field | record 370a | record 370b |
|---|---|---|
| VIM ID | GA | GB |
| Channel | IP multicast address 1 | IP multicast address 2 |
| Key - transmit | depress button 226a | depress button 226b |
| Key - stop transmission | release button 226a | release button 226b |
| Key - repeat | # key, button 226a | # key, button 226b |
| Key - acknowledge | * key, button 226a | * key, button 226b |
| Visual - recorded audio | lamp for button 226a | lamp for button 226b |
| Visual - number messages | display 212 | flickers per second up to 3 |

In various embodiments, data that defines group A by the person names or other identifiers is reported or stored elsewhere or is included in configuration data records 370. For purposes of illustration, it is assumed that group A includes persons at telephones 130a, 130b, 130c and that Group B includes persons at telephone 130a, 130c, 130d, and computer 170, as published in a telephone roster. A system manger uses that information to configure multicast groups 1 and 2, as is well known in the art.

In some embodiments, step 410 is not performed at a telephone set but on a separate device that controls the telephone set, such as ATA 160 for legacy analog telephone sets 162 or central PBX 150 for wired telephone sets 116.

In step 420, it is determined whether a VIM transmit key is activated. That is, it is determined in step 420 that a signal is generated that indicates a sequence of one or more keys have been depressed, where the sequence is associated with a VIM transmit function in the key field 376 for a particular VIM ID. For example, it is determined that key 226a associated with VIM ID GA or key 226b associated with VIM ID GB is depressed in step 420. If it is determined in step 420, that a VIM transmit key is activated, then control passes to step 422.

In some embodiments, step 420 is not performed at a telephone set but on a separate device that controls the telephone set, such as ATA 160 for legacy analog telephone sets 162 or central PBX 150 for wired telephone sets 116. The controlling device receives a signal from the telephone set based on the keys depressed on the telephone set and the controlling device determines whether the signal is in the key field 376 associated with a VIM ID in the configuration data.

In step 422, an audio signal picked up by a microphone while the transmit key is activated is recorded as VIM audio data in association with the VIM ID. In some embodiments, step 420 is not performed at a telephone set but on a separate device that controls the telephone set. Step 422 is included in embodiments that perform store and forward processing of VIM audio data. Such an approach is suitable in some embodiments, for example in embodiments in which a POTS call has to be placed to one or more distant phones. For example, if telephone set 116a is included in the VIM ID, then the channel data for the VIM ID includes data that indicates a telephone call to the phone 116a, or to PBX 150, is involved, and step 422 is performed to prevent loss of data while the connection is established. For voice over IP (VoIP) applications, such a store and forward approach is not always needed. Thus, in some embodiments, the data is not stored by the telephone set or the separate device that controls the telephone set, and step 422 is omitted.

In step 424 access to the channel associated with the VIM ID is obtained. In some embodiments, access is automatic. For example, in some embodiments several senders are allowed to talk over each other on the channel associated with the VIM ID. In some embodiments, such cross talk is not allowed, and the channel is locked to all but one sender at a time. In such embodiments several potential senders apply for a lock to a channel arbitration server and the lock is granted to one of them. For example, in some embodiments, step 424 includes requesting a lock for a multicast address from a channel arbitration process in VIM process 145 in a call manager server 140.

In some embodiments, step 424 is not performed at a telephone set but on a separate device that controls the telephone set.

In step 426, the audio signal picked up by the microphone on the telephone set while the transmit key is activated is sent over the channel associated with the VIM ID. For example, if button 226 is depressed, the audio signal picked up by a handset microphone 202 on the telephone set 130a is sent as VoIP data packets to multicast address 2. In some embodiments, step 426 is not performed at a telephone set but on a separate device that controls the telephone set.

In step 428, the channel associated with the VIM ID is released when the key signal indicates the end of transmission. Step 428 includes an implied determination (not shown) that the stop transmission key sequence has been detected. If not, transmit conditions still apply and control passes back to step 426 to continue to transmit until the key sequence for stopping transmission is received. For example, when the depressed key associated with transmission (e.g., button 226b for VIM ID GB) changes from depressed to not depressed, transmission stops. In some embodiments, the channel is locked and step 428 includes releasing the lock obtained for the channel. In some embodiments, the channel is not locked and step 428 does not involve releasing a lock for the channel. In some embodiments, step 428 is not performed at a telephone set but on a separate device that controls the telephone set.

Control then passes to step 430. In some embodiments, step 422, step 424, step 426, and step 428 are performed by a transmit agent process that is invoked upon detection of the transmit key sequence, and the agent process runs in parallel with other processes on the acting node. In such embodiments, the agent process terminates after step 428.

If it is determined in step 420 that a VIM transmit key is not activated, control passes to step 430.

In step 430, it is determined whether a new message is starting on a communications channel associated with a VIM ID. For example, it is determined in step 430 whether a data packet is received with an IP destination address having a value of a multicast address (e.g., multicast address 2) associated with a VIM ID (e.g., GB) in the VIM configuration records 370. The RTP protocol supports a continuous stream of audio data. So, in some embodiments, any data packet that is on the multicast channel but not part of a continuous stream is treated as a start of a new audio message. This circumstance arises when a remote member of the VIM ID group (e.g., telephone set 130*c*) goes through the steps 420 to 428, described above and begins transmitting VIM audio data. If it is determined, in step 430, that a new message is starting on a communications channel associated with a VIM ID, then control passes to step 440 and following steps depicted in FIG. 4B, and described in more detail below with reference to FIG. 4B. In these steps, the VIM audio data is presented on a telephone set based on data in the local play options field 360 and the visual field 378 for the associated VIM ID. The VIM audio data is also stored in association with the VIM ID, such as in VIM audio data field 384 associated with a VIM ID in the VIM ID field 382. After step 458 depicted in FIG. 4B, control passes to step 480.

In some embodiments, step 430 is not performed at a telephone set but on a separate device that controls the telephone set. The controlling device receives a signal from a remote telephone set or its controller and determines whether the signal indicates a new message on a channel associated with a VIM ID.

In some embodiments, step 440 and following steps depicted in FIG. 4B are performed by a presentation agent process that is invoked upon detection of the new message on the channel, and the agent process runs in parallel with other processes on the acting node. In such embodiments, the agent process terminates after step 458.

If it is determined in step 430 that a new message is not starting on a communications channel associated with a VIM ID, then control passes to step 480.

In step 480, it is determined whether a VIM repeat key is activated. That is, it is determined in step 480 that a signal is generated that indicates a sequence of one or more keys have been depressed, where the sequence is associated with a VIM repeat function in the key field 376 for a particular VIM ID. For example, it is determined that # key is depressed and released followed by depressing and releasing the button 226*a* associated with VIM ID GA or button 226*b* associated with VIM ID GB. If it is determined in step 480 that a VIM repeat key is activated, then control passes to step 482.

In some embodiments, step 480 is not performed at a telephone set but on a separate device that controls the telephone set. The controlling device receives a signal from the telephone set based on the keys depressed on the telephone set and the controlling device determines whether the signal is in the key field 376 associated with a VIM ID in the configuration data for performing the VIM repeat function.

In step 482 recorded VIM audio data associated with the VIM ID is presented at the telephone set. For example, if the VIM repeat key activated is associated with VIM ID GB, then VIM audio data stored in data structure 350 in association with VIM ID GB is presented at the telephone, e.g., by being played over ear piece speaker 203. In some embodiments, step 482 is not performed at a telephone set but on a separate device that controls the telephone set. The controlling device retrieves the VIM audio data from its memory and causes the retrieved VIM audio data to be played on the telephone set, such as over ear piece speaker 203.

Control then passes to step 490. In some embodiments, step 482 is performed by a repeat agent process that is invoked upon detection of the repeat key sequence, and the agent process runs in parallel with other processes on the acting node. In such embodiments, the agent process terminates after step 482.

If it is determined in step 480 that a VIM repeat key is not activated, then control passes to step 490. In some embodiments, steps 480 and 482 are omitted, and control passes directly to step 490.

In step 490, it is determined whether a VIM acknowledgment (ACK) key is activated. That is, it is determined in step 490 that a signal is generated that indicates a sequence of one or more keys have been depressed, where the sequence is associated with a VIM ACK function in the key field 376 for a particular VIM ID. For example, it is determined that the * key is depressed and released followed by depressing and releasing the button 226*a* associated with VIM ID GA or button 226*b* associated with VIM ID GB. If it is determined in step 490 that a VIM ACK key is activated, then control passes to step 492.

In some embodiments, step 490 is not performed at a telephone set but on a separate device that controls the telephone set. The controlling device receives a signal from the telephone set based on the keys depressed on the telephone set and the controlling device determines whether the signal is in the key field 376 associated with a VIM ID in the configuration data for performing the VIM ACK function.

In step 492, recorded VIM audio data associated with the VIM ID is presented at the telephone set. For example, if the VIM ACK key activated is associated with VIM ID GB, then VIM audio data stored in data structure 350 in association with VIM ID GB is presented at the telephone, e.g., by being played over ear piece speaker 203. In some embodiments, step 492 is not performed at a telephone set but on a separate device that controls the telephone set. The controlling device retrieves the VIM audio data from its memory and causes the retrieved VIM audio data to be played on the telephone set, such as over ear piece speaker 203. In some embodiments, step 492 is omitted. For example, in some embodiments that include steps 480 and 482, step 492 is omitted. Control then passes to step 494.

In step 494, recorded VIM audio data associated with the VIM ID is deleted. For example, if the VIM ACK key activated is associated with VIM ID GB, then VIM audio data stored in data structure 350 in association with VIM ID GB is deleted. In some embodiments, step 492 is not performed at a telephone set but on a separate device that controls the telephone set. The controlling device deletes the VIM audio data from its memory.

Control then passes back to step 420. In some embodiments, step 492 and step 494 are performed by an ACK agent process that is invoked upon detection of the ACK key sequence, and the agent process runs in parallel with other processes on the acting node. In such embodiments, the agent process terminates after step 494.

FIG. 4B illustrates steps in an example method for presenting VIM audio data that is transmitted from a remote source in near real-time as the VIM audio data is generated. Control passes to step 440 from step 430, in which it is determined that a new message is starting over a communication channel associated with a particular VIM ID, e.g., VIM ID GB.

In step 440 a lamp associated with the VIM ID for the channel is lit on a telephone set—without prompting a user of the telephone set to do anything. In general, a visual presentation component on the telephone set associated in VIM configuration data with the VIM ID is operated according to the configuration data. In the illustrated embodiment, a lamp for button 226*b*, associated with the VIM ID GB, is lit on a telephone set. Step 442 includes causing the visual presentation component to behave as indicated in the configuration data. For example to present text on display 212 or to cause the lamp to flicker. It is assumed for purposes of illustration that one record of audio data for the same VIM ID is already stored. Therefore, based on the visual field 378*b* associated with VIMID GB listed in Table 2, the lamp is made to flicker twice per second.

In some embodiments, step 440 is not performed at a telephone set but on a separate device that controls the telephone set. The controlling device determines the lamp or other visual component associated with the VIM ID and causes that lamp to light on the telephone set in accordance with the configuration data for the visual presentation component. Control then passes to step 442.

In step 442 the VIM audio data received over the communication channel is stored in association with the VIM ID for the channel. For example, the audio data received in VoIP data packets addressed to IP multicast address 2 is stored in VIM audio data field 382 in association with VIM ID field 382 in which is stored data that indicates GB. Step 442 provides persistence of the VIM audio data that is not provided, for example, by an intercom service. In some embodiments, step 442 is not performed at a telephone set but on a separate device that controls the telephone set. Control then passes to step 448.

In step 448, presence for a user of the telephone set is determined. Any method may be used to obtain the presence data. For example, presence data associated with the user's text instant messaging (IM) is used. It is assumed for purpose of illustration that three state indicated by presence data are of concern for VIM operations. The three presence states are unknown, not present, and other. It is further assumed that a user input state of "do not disturb" is included in the not present state, and that all other states, including present and available, are considered other. In some embodiments, step 448 is omitted. In some embodiments, step 448 is not performed at a telephone set but on a separate device that controls the telephone set.

Control then passes to step 450 and the following steps to enforce the local play options based on a state of the telephone set and user presence, e.g., as listed in Table 1. Many combinations of states are possible and all will not be described here. It is assumed for purposes of illustration that presence data is obtained and therefore the two states in Table 1 for presence unknown are not described here. It is evident from the following steps described and Table 1 the behavior that is indicated for the case of unknown presence.

In step 450 it is determined whether the telephone set is idle, that is, whether the telephone set is not currently in use for sending or receiving audio data associated with a different call than the current VIM audio data. If the telephone set is idle, then control passes to step 452.

In step 452, it is determined whether the person associated with the telephone set is present based on the presence data. If not, then control passes to step 460 to forward the VIM audio data in accordance with the local play option. For example, as indicated in the second line of Table 1 for the state Idle-not present, the VIM audio data is forwarded to the person's voice mail. Control then passes to step 458.

If the person is present (e.g., the presence state is other), then control passes to step 454 to cause the VIM audio data to be played on the room speaker 205 in accordance with the third line of Table 1 for the state Idle-other presence. In embodiments in which the controller device and not the telephone set performs steps 450 and 452, the controller device causes the telephone set to perform steps 454 and 460.

If it is determined in step 450 that the telephone set is not idle, then the telephone set is busy. Control passes to step 472 to determine whether the person is present, as in step 452. If not, then control passes to step 460 to forward the VIM audio data in accordance with the local play option, as described above.

If the person is present (e.g., the presence state is other), then control passes to step 474 to cause the VIM audio data to be played in accordance with the local play options. In step 474 it is determined whether the local play options indicate playing the VIM audio or an alert. If it is determined in step 747 that the local play option is to mix the VIM audio data with the call in the person's ear, control passes to step 476 to mix the VIM audio onto the telephone ear piece speaker 203. Control then passes to step 458.

If it is determined in step 474 that the local play option is not to mix the VIM audio data, then control passes to step 478 to mix an alert sound onto the telephone ear piece speaker 203. Control then passes to step 458. In some embodiments (not shown), the play option is to mix neither the alert data nor the audio data into the ear-piece; and control passes to step 460 to otherwise process the data.

According to the last line of Table 1 for the state Busy-other, the local play option is to mix in the VIM audio data onto the ear piece speaker and control passes to step 476 to do so. In embodiments in which the controller device and not the telephone set performs steps 450 and 452, the controller device causes the telephone set to perform steps 476 and 478 as well.

In step 458, processing of the audio data is finished and control passes to step 480 and following steps described above with reference to FIG. 4A.

The example method 400 and data structure 350 provide instant, persistent audio messages to multiple recipients without a computer. Such service is not available with prior known approaches.

5.0 Implementation Mechanisms—Hardware Overview

Figure 5:
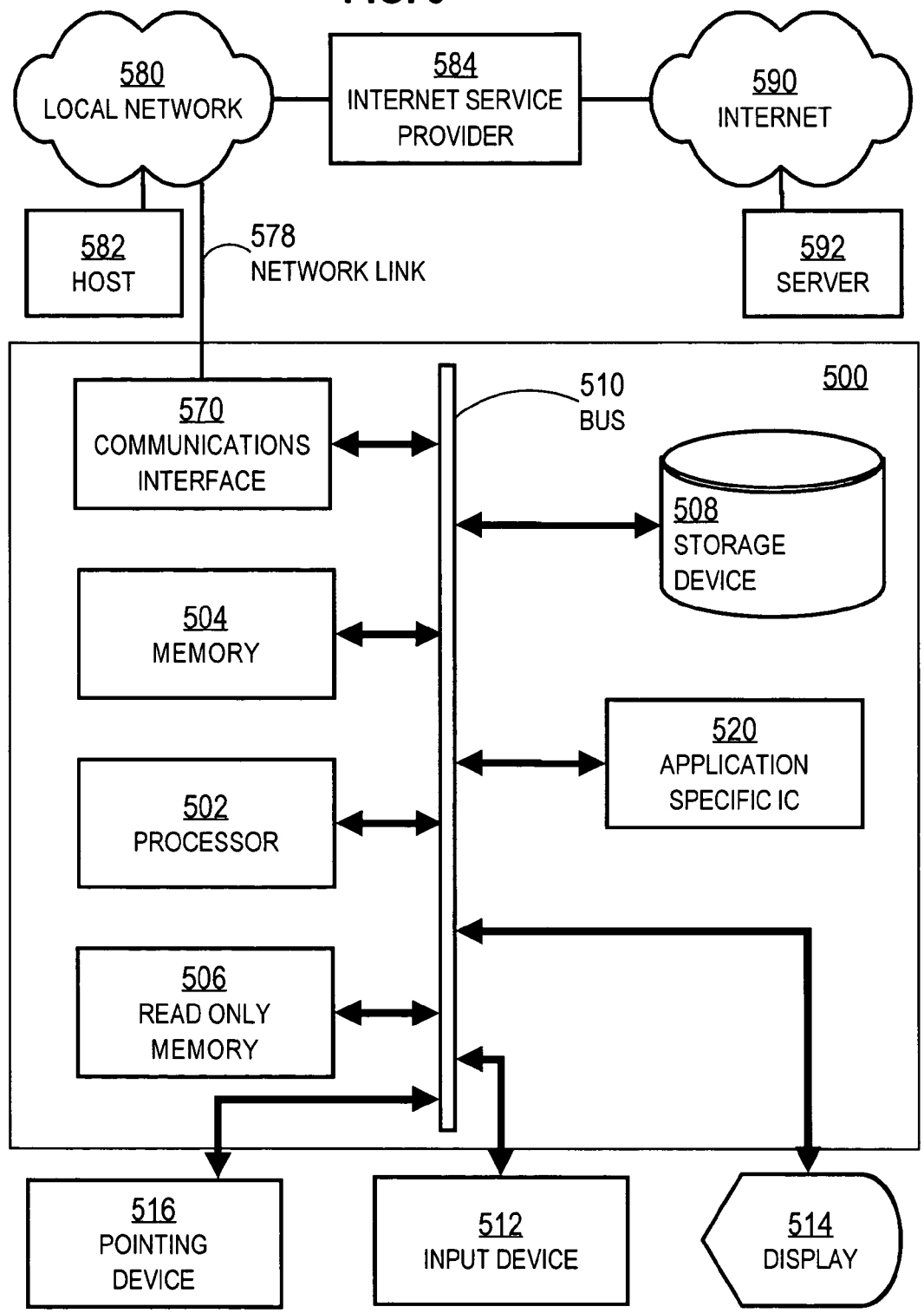
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitute computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

Information, including instructions, is provided to the bus 510 for use by the processor from an external input device 512, such as a keyboard containing alphanumeric keys operated by a human user, or a sensor. A sensor detects conditions in its vicinity and transforms those detections into signals compatible with the signals used to represent information in computer system 500. Other external devices coupled to bus 510, used primarily for interacting with humans, include a display device 514, such as a cathode ray tube (CRT) or a liquid crystal display (LCD), for presenting images, and a pointing device 516, such as a mouse or a trackball or cursor direction keys, for controlling a position of a small cursor image presented on the display 514 and issuing commands associated with graphical elements presented on the display 514.

In the illustrated embodiment, special purpose hardware, such as an application specific integrated circuit (IC) 520, is coupled to bus 510. The special purpose hardware is configured to perform operations not performed by processor 502 quickly enough for special purposes. Examples of application specific ICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends and receives electrical, acoustic or electromagnetic signals, including infrared and optical signals, that carry information streams, such as digital data. Such signals are examples of carrier waves.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Network link 578 typically provides information communication through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides information representing video data for presentation at display 514.

The invention is related to the use of computer system 500 for implementing the techniques described herein. According to one embodiment of the invention, those techniques are performed by computer system 500 in response to processor 502 executing one or more sequences of one or more instructions contained in memory 504. Such instructions, also called software and program code, may be read into memory 504 from another computer-readable medium such as storage device 508. Execution of the sequences of instructions contained in memory 504 causes processor 502 to perform the method steps described herein. In alternative embodiments, hardware, such as application specific integrated circuit 520, may be used in place of or in combination with software to implement the invention. Thus, embodiments of the invention are not limited to any specific combination of hardware and software.

The signals transmitted over network link 578 and other networks through communications interface 570, which carry information to and from computer system 500, are exemplary forms of carrier waves. Computer system 500 can send and receive information, including program code, through the networks 580, 590 among others, through network link 578 and communications interface 570. In an example using the Internet 590, a server 592 transmits program code for a particular application, requested by a message sent from computer 500, through Internet 590, ISP equipment 584, local network 580 and communications interface 570. The received code may be executed by processor 502 as it is received, or may be stored in storage device 508 or other non-volatile storage for later execution, or both. In this manner, computer system 500 may obtain application program code in the form of a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to an infra-red signal, a carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
   receiving configuration data for a particular telephone set of an enterprise plurality of telephone sets that are associated with an enterprise, wherein the configuration data includes VIM ID data that indicates a voice instant messaging (VIM) group identifier (ID) for a particular group plurality of telephone sets of the enterprise plurality of telephone sets, and local presentation data that indicates how VIM audio data is to be presented on the particular telephone set;
   receiving a start signal that indicates a start of a new message directed to the particular telephone set over a particular communication channel associated with the VIM ID; and
   causing VIM audio data to be received over the particular communication channel after the start signal and recorded in association with the VIM ID;
   if the particular telephone set is not currently in use, causing the VIM audio data to be played over a first speaker on the particular telephone set;
   if the particular telephone set is currently in use, determining whether to mix the VIM audio data with any different audio data also received at the particular telephone set based on the local presentation data; and
   if the VIM audio data is to be mixed with any different audio data, causing the VIM audio data to be mixed with the different audio data and played over a second speaker on the particular telephone set.

2. A method as recited in claim 1, wherein receiving configuration data further comprises receiving configuration data that includes channel data that indicates the particular communication channel associated with the VIM ID for communicating with all other telephone sets in the particular group plurality of telephone sets.

3. A method as recited in claim 2, wherein the channel data indicates an IP multicast group and the communication channel is an Internet Protocol (IP) data packet directed to the multicast group.

4. A method as recited in claim 1, wherein:
   receiving configuration data further comprises receiving configuration data that includes visual indicator data that indicates how to operate a visual presentation component associated with the VIM ID on the particular telephone set; and
   the method further comprises, in response to receiving the start signal, causing the visual presentation component on the particular telephone set to be operated based on the visual indicator data.

5. A method as recited in claim 4, wherein causing the visual presentation component to be operated based on the visual indicator data further comprises causing the visual presentation component to be operated differently based on the visual indicator data and based on a number of different VIM audio data that are currently recorded in association with the VIM ID.

6. A method as recited in claim 1, wherein:
   the method further comprises receiving presence data that indicates whether a user of the telephone set is available in a vicinity of the telephone set; and
   causing the VIM audio data to be played over the first speaker further comprises:
      determining whether the user of the telephone set is available in the vicinity of the telephone set based on the presence data; and
      causing the VIM audio data to be played over the first speaker only if the user of the telephone set is available in the vicinity of the telephone set.

7. A method as recited in claim 1, wherein the second speaker is the same as the first speaker.

8. A method as recited in claim 1, wherein the first speaker is a room speaker and the second speaker is an ear piece speaker.

9. A method as recited in claim 1, further comprising, if the particular telephone set is currently in use:
   determining whether to mix VIM audio alert data with any different audio data also received at the particular telephone set based on the local presentation data; and
   if the VIM audio alert data is to be mixed with any different audio data, causing the VIM audio alert data to be mixed with the different audio data and played over a second speaker on the particular telephone set.

10. A method as recited in claim 1 wherein:
    receiving configuration data further comprises receiving configuration data that includes VIM key data that indicates a sequence of one or more keys on the particular telephone set to be pressed by a user of the telephone set to perform a function associated with the VIM ID; and
    the method further comprises:
       receiving a key signal that indicates the sequence of one or more keys to perform the function associated with the VIM ID that have been pressed; and in response to receiving the key signal, performing the function associated with the VIM ID.

11. A method as recited in claim 10, wherein performing the function associated with the VIM ID further comprises generating outbound VIM audio data by:
   obtaining access to the communication channel associated with the VIM ID for the particular telephone set; and
   causing audio input data from a microphone on the particular telephone set to be sent over the communication channel associated with the VIM ID.

12. A method as recited in claim 10, wherein performing the function associated with the VIM ID further comprises terminating outbound VIM audio data by releasing access to the communication channel associated with the VIM ID.

13. A method as recited in claim 10, wherein performing the function associated with the VIM ID further comprises repeating VIM audio data by causing the VIM audio data that was recorded in association with the VIM ID to be played on a second speaker of the telephone set.

14. A method as recited in claim 10, wherein performing the function associated with the VIM ID further comprises acknowledging received VIM audio data and causing the VIM audio data that was recorded in association with the VIM ID to be erased.

15. A method as recited in claim 14, wherein acknowledging received VIM audio data further comprises causing the VIM audio data that was recorded in association with the VIM ID to be played on a second speaker of the telephone set before causing the VIM audio data that was recorded in association with the VIM ID to be erased.

16. A system comprising:
   means for receiving configuration data for a particular telephone set of an enterprise plurality of telephone sets that are associated with an enterprise, wherein the configuration data includes VIM ID data that indicates a voice instant messaging (VIM) group identifier (ID) for a particular group plurality of telephone sets of the enterprise plurality of telephone sets, and local presentation data that indicates how VIM audio data is to be presented on the particular telephone set;
   means for receiving a start signal that indicates a start of a new message directed to the particular telephone set over a particular communication channel associated with the VIM ID;
   means for causing VIM audio data to be received over the particular communication channel after the start signal and recorded in association with the VIM ID in response to receiving the start signal;
   means for causing the VIM audio data to be played over a first speaker on the particular telephone set, if the particular telephone set is not currently in use; and
   means for determining whether to mix the VIM audio data with any different audio data also received at the particular telephone set based on the local presentation data if the particular telephone set is currently in use.

17. An apparatus comprising:
   a network interface for communicating therewith a data packet for a telephone set that has a speaker, a microphone and a visual presentation component;
   one or more processors;
   a computer-readable non-transitory medium; and
   one or more sequences of instructions stored in the computer-readable medium, which, when executed by the one or more processors, causes the one or more processors to:
      receive configuration data for a particular telephone set of an enterprise plurality of telephone sets that are associated with an enterprise, wherein the configuration data includes VIM ID data that indicates a voice instant messaging (VIM) group identifier (ID) for a particular group plurality of telephone sets of the enterprise plurality of telephone sets;
      receive a start signal that indicates a start of a new message directed to the particular telephone set over a particular communication channel associated with the VIM ID; and
      in response to receiving the start signal:
         cause VIM audio data to be received over the particular communication channel after the start signal and recorded in association with the VIM ID;
         determine whether the particular telephone set is currently in use for receiving different audio data or sending different audio data;
         if the particular telephone set is not currently in use, cause the VIM audio data to be played over a first speaker on the particular telephone set;
         if the particular telephone set is currently in use, determine whether to mix the VIM audio data with any different audio data also received at the particular telephone set based on the local presentation data; and
         if the VIM audio data is to be mixed with any different audio data, cause the VIM audio data to be mixed with the different audio data and played over a second speaker on the particular telephone set.

18. An apparatus as recited in claim 17, wherein receive configuration data further comprises receiving configuration data that includes channel data that indicates the particular communication channel associated with the VIM ID for communicating with all other telephone sets in the particular group plurality of telephone sets.

19. An apparatus as recited in claim 18, wherein the channel data indicates an IP multicast group and the communication channel is an Internet Protocol (IP).

20. An apparatus as recited in claim 17, wherein:
   receive configuration data further comprises receiving configuration data that includes visual indicator data that indicates how to operate a visual presentation component associated with the VIM ID on the particular telephone set; and
   the apparatus is configured to, in response to receiving the start signal, cause the visual presentation component on the particular telephone set to be operated based on the visual indicator data.

21. An apparatus as recited in claim 20, wherein cause the visual presentation component to be operated based on the visual indicator data further comprises causing the visual presentation component to be operated differently based on the visual indicator data and based on a number of different VIM audio data that are currently recorded in association with the VIM ID.

22. An apparatus as recited in claim 17, wherein:
   execution of the one or more sequences of instructions further causes the one or more processors to receive presence data that indicates whether a user of the telephone set is available in a vicinity of the telephone set; and
   cause the VIM audio data to be played over the first speaker further comprises:
      determine whether the user of the telephone set is available in the vicinity of the telephone set based on the presence data; and cause the VIM audio data to be played over the first speaker only if the user of the telephone set is available in the vicinity of the telephone set.

23. An apparatus as recited in claim 17, wherein the second speaker is the same as the first speaker.

24. An apparatus as recited in claim 17, wherein the first speaker is a room speaker and the second speaker is an ear piece speaker.

25. An apparatus as recited in claim 17, wherein execution of the one or more sequences of instructions further causes the one or more processors, if the particular telephone set is currently in use, to:
   determine whether to mix VIM audio alert data with any different audio data also received at the particular telephone set based on the local presentation data; and
   if the VIM audio alert data is to be mixed with any different audio data, cause the VIM audio alert data to be mixed with the different audio data and played over a second speaker on the particular telephone set.

26. An apparatus as recited in claim 17 wherein:
   receive configuration data further comprises receiving configuration data that includes VIM key data that indicates a sequence of one or more keys on the particular telephone set to be pressed by a user of the telephone set to perform a function associated with the VIM ID; and
   execution of the one or more sequences of instructions further causes the one or more processors to:
      receive a key signal that indicates the sequence of one or more keys to perform the function associated with the VIM ID have been pressed; and
      in response to receiving the key signal, perform the function associated with the VIM ID.

27. An apparatus as recited in claim 26, wherein perform the function associated with the VIM ID further comprises generating outbound VIM audio data to:
   obtain access to the communication channel associated with the VIM ID for the particular telephone set; and
   cause audio input data from a microphone on the particular telephone set to be sent over the communication channel associated with the VIM ID.

28. An apparatus as recited in claim 26, wherein perform the function associated with the VIM ID further comprises terminating outbound VIM audio data by releasing access to the communication channel associated with the VIM ID.

29. An apparatus as recited in claim 26, wherein perform the function associated with the VIM ID further comprises repeating VIM audio data by causing the VIM audio data that was recorded in association with the VIM ID to be played on a second speaker of the telephone set.

30. An apparatus as recited in claim 26, wherein perform the function associated with the VIM ID further comprises acknowledging received VIM audio data and causing the VIM audio data that was recorded in association with the VIM ID to be erased.

31. An apparatus as recited in claim 30, wherein acknowledging received VIM audio data further comprises causing the VIM audio data that was recorded in association with the VIM ID to be played on a second speaker of the telephone set before causing the VIM audio data that was recorded in association with the VIM ID to be erased.

* * * * *